Feb. 11, 1930.   S. H. GROSSER   1,746,468
CRANKING APPARATUS FOR INTERNAL COMBUSTION MOTORS
Filed July 18, 1928
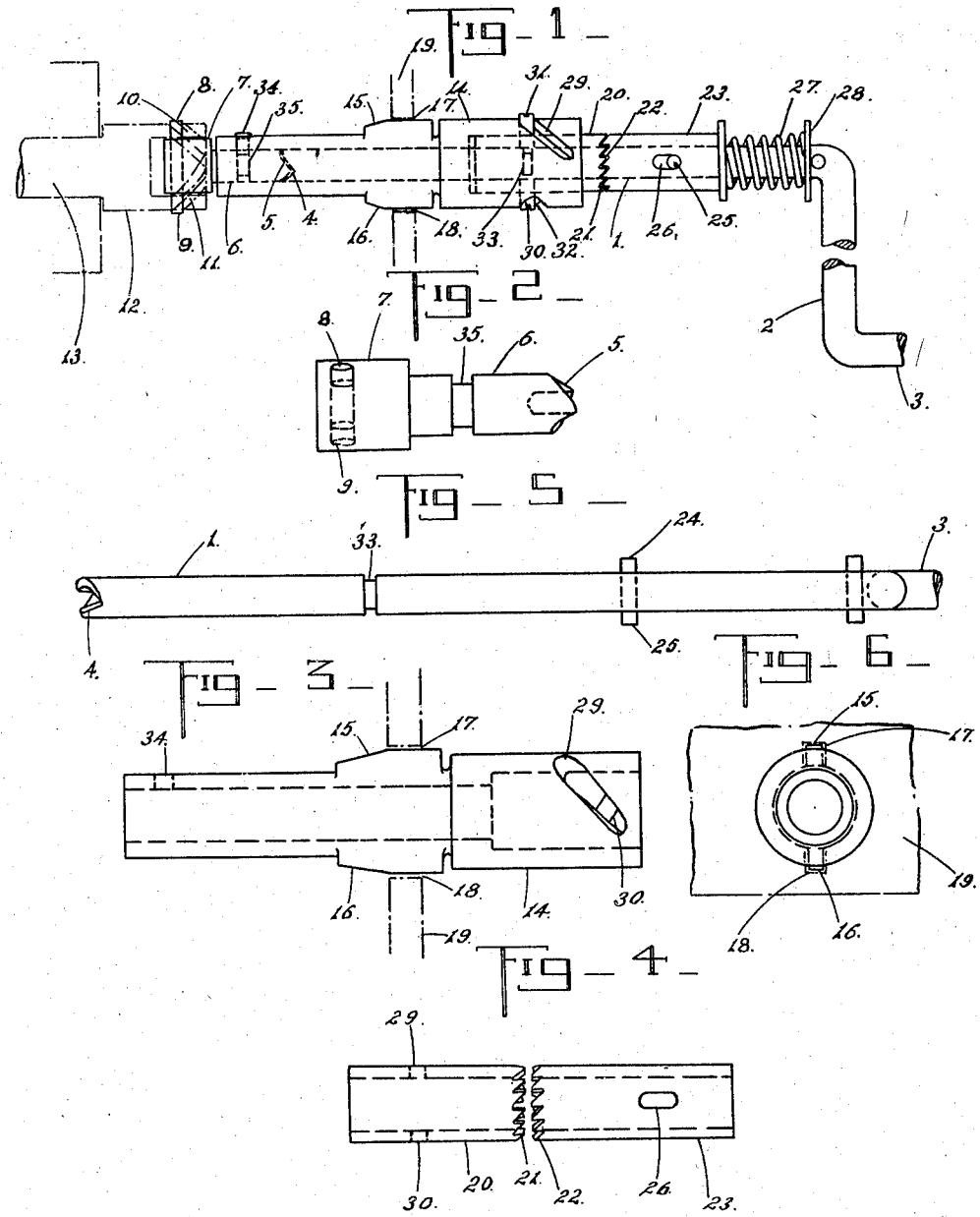

Patented Feb. 11, 1930

1,746,468

UNITED STATES PATENT OFFICE

SIDNEY HAROLD GROSSER, OF KILLARNEY, BOGGABRI, NEW SOUTH WALES, AUSTRALIA

CRANKING APPARATUS FOR INTERNAL-COMBUSTION MOTORS

Application filed July 18, 1928. Serial No. 293,588.

The invention relates to the starting of internal combustion motors by hand cranking.

The object of the invention is to render it impossible for the operator to be injured in event of "back fire" of the motor.

According hereto a cranking handle has a stem connected by a clutch with a head connectible by the usual bayonet joint with the starting crank spindle of the motor.

Means hereinafter described are employed whereby when the starting crank spindle is rotated backwardly due to "back fire" of the motor the stem referred to is moved outwardly thereby disengaging the clutch and leaving the head to turn freely with the starting crank spindle.

I will now describe my invention in detail by aid of the accompanying drawing wherein:—

Figs. 1 to 4. inclusive are side elevations illustrating the apparatus and its component parts.

Fig. 5. is a plan of one of the parts and

Fig. 6. an end elevation looking from the right of Fig. 3.

Similar figures of reference indicate corresponding parts throughout the figures.

The stem 1. is cranked at right angles at 2. and is provided with a handle upon its end 3.

Upon the end of stem 1. is part 4., of a dog clutch adapted to engage an opposing part 5. formed upon the end of the stub stem 6. projecting from the turning head 7. See particularly Fig. 2.

Head 7. has the projecting pins 8. and 9. which pass into curved slots 10. and 11. in the socket 12. upon the end of the starting crank spindle 13. of the motor.

A sleeve 14. upon stem 1. and also receiving stub stem 6. has projecting keys 15. and 16. which engage in corresponding slots 17. and 18. in the fixed plate 19. and prevent rotation of the sleeve.

A sleeve 20. upon stem 1. and partly within sleeve 14. has at its end the recesses 21. adapted to receive corresponding ratchet teeth 22. in the end of a sleeve 23. upon stem 1. and rotated therewith by pins 24. and 25. projecting from the stem and engaging in longitudinal slots 26. in the sleeve.

A coil compression spring 27. surrounding stem 1. between the sleeve 23. and a collar 28. tends to engage the teeth 21. in the recesses 22.

Passing through sleeve 14. are the diagonal slots 29. and 30. through which pass respectively the pins 31. and 32. which screw into the sleeve 20. and project therethrough into a circumferential recess 33. in stem 1.

A pin 34. screwed into the sleeve 14. projects therethrough into a circumferential recess 35. and prevents the stub stem from coming out of the sleeve.

In operation, when the parts are in position shown in Fig. 1. turning of the stem 1. "clockwise" by means of its handle will turn the starting crank spindle 13. in the same direction.

Upon "back fire" of the motor and consequent reversal of direction of rotation of the starting crank spindle the stem 1. is partly rotated in a backward direction and with it, because of pins 24. and 25. the sleeve 23.

The ratchet teeth 22. are shaped to rotate the sleeve 20. when sleeve 23. is rotated backwardly and the pins 31. and 32. being guided by the slots 29. and 30. in sleeve 14. cause the stem 1. to slide longitudinally whereby the part 4. of the dog clutch at its end is disengaged from part 5. thereof upon stub stem 6.

The head 7. is thus free to rotate independently of other parts of the mechanism.

When the stem 1. is turned by its handle in a forward direction the stem again moves back into its normal position with the parts of the dog clutch in engagement.

I claim:

For the purpose indicated in combination a cranking handle having a stem in two parts, clutch means for connecting the ends thereof, means for connecting the stem to the starting crank spindle of a motor a sleeve upon the stem projecting wings thereon, diagonal slots in said sleeve, a second sleeve upon the stem, pins thereon guided by said slots, recesses upon the end of the second sleeve, a third sleeve upon the stem having teeth adapted to engage said recesses means for rotating the third sleeve with the stem and permitting longitudinal movement relative thereto, spring means tending to slide the third sleeve whereby said ratchet teeth engage said recesses substantially as herein specified.

In testimony whereof I have signed my name to this specification.

S. H. GROSSER.